D. Elicker,
Washing Machine.
No. 102,928.  Patented May 10, 1870.
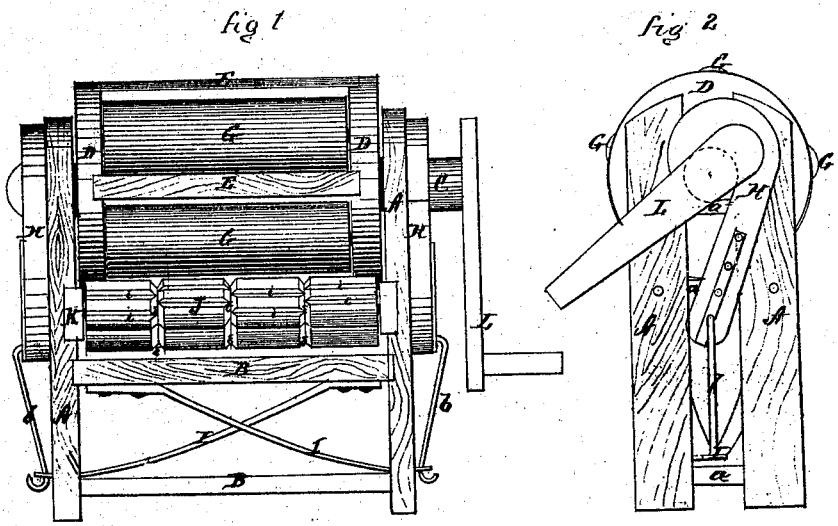

United States Patent Office.

DANIEL ELICKER, OF MULBERRY, PENNSYLVANIA.

Letters Patent No. 102,928, dated May 10, 1870.

IMPROVED WASHING-MACHINE.

The Schedule referred to in these Letters Patent and making part of the same.

*To all whom it may concern:*

Be it known that I, DANIEL ELICKER, of Mulberry, in the county of York and in the State of Pennsylvania, have invented certain new and useful Improvements in Washing-Machine; and do hereby declare that the following is a full, clear, and exact description thereof, reference being had to the accompanying drawings and to the letters of reference marked thereon making a part of this specification.

The nature of my invention consists in the construction and arrangement of a "washing-machine," as will be hereinafter fully set forth.

In order to enable others skilled in the art to which my invention appertains to make and use the same, I will now proceed to describe its construction and operation, referring to the annexed drawings, in which—

Figure 1 is a front view, and

Figure 2 is a side view of my machine.

Each side of the frame of my machine is composed of two standards, A A, placed a suitable distance apart, and connected by means of small blocks $a\ a$, and the two sides of the frame are connected by bars B B.

On the upper blocks $a\ a$ of each side, a shaft, C, has its bearings, on which shaft are placed two cylinder-heads, D D, connected by means of a series of bars, E E, between which are placed rollers G G, the journals of which have their bearings in the heads D D.

The shaft C is held down onto the bearings by a hook, H, on each side of the machine, the lower end of which is connected by a rod, $b$, to a spring, I, attached to the under side of the connecting-bar B, thus holding the shaft and cylinder down, at the same time allowing it to yield when necessary.

Under the cylinder D E G are placed four rollers, J J, the journals of which have their bearings in cross-bars, K K, in the sides of the frame.

These rollers are placed in curved form, corresponding with the cylinder, and are all, by grooves $e\ e$ running around them, divided in any suitable number of sections.

The sections of the two outside rollers are grooved longitudinally by grooves $i\ i$, as shown in fig. 1.

One end of the shaft C is provided with a crank, L, for turning the cylinder.

Having thus fully described my invention,

What I claim as new, and desire to secure by Letters Patent, is—

The combination of the cylinder, composed of the heads D D, rollers G G, and connecting-bars E E, with the frame A, having the grooved rollers J J, said cylinder being secured above the rollers by the hooks connected to the springs I I by the rods $b$, all substantially as set forth.

In testimony that I claim the foregoing, I have hereunto set my hand this 14th day of March, 1870.

DANIEL ELICKER.

Witnesses:
PETER J. DETTER,
AMES RAFFENSPARGER.